2,761,767

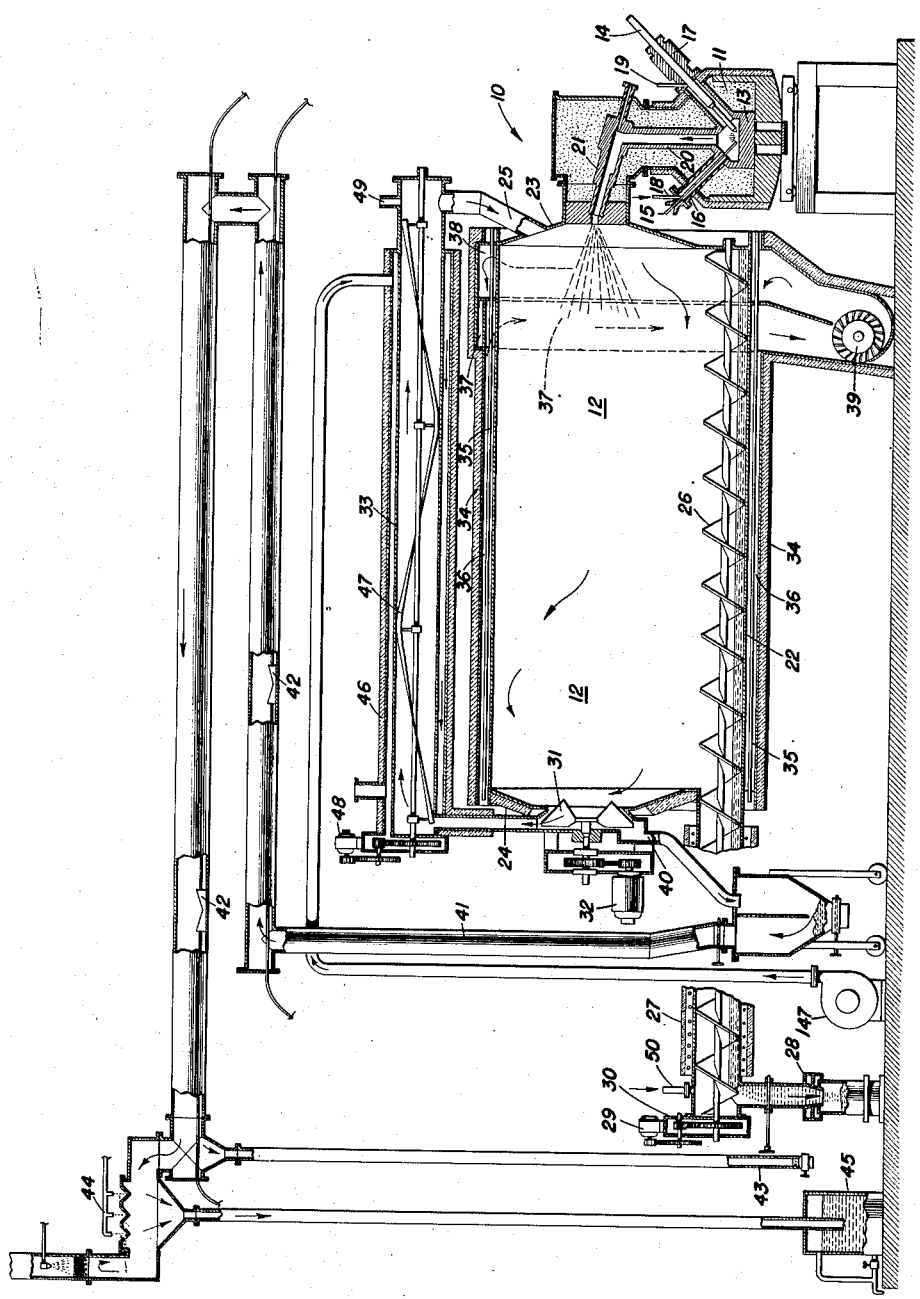

APPARATUS FOR THE MANUFACTURE OF RED LEAD

René A. Perieres, Grenoble, France, assignor to La Societe Francais dite Solumeta, Paris, France, a corporation Application January 7, 1952, Serial No. 265,290

2 Claims. (Cl. 23—262)

This invention relates to the manufacture of red lead and more particularly to a method and apparatus for the production of red lead from metallic lead.

It has been known in the prior art that red lead may be manufactured by the steps of first vaporizing metallic lead by introducing it into an electric furnace of high concentrated power and then converting the lead vapors into red lead by burning them in an excess of oxygen in a wide vessel known as a condensation chamber. This process permits the manufacturing of red lead in a finely divided condition, the product having a high percentage of $Pb_3O_4$ and constituting a paint pigment of exceptionally high quality. Unfortunately, the plants making use of the prior art process have not been able to operate without interruption; sometimes the outlet of the vaporizing furnace becomes completely blocked by a mixture of lead, litharge, and red lead so that the process stops completely; sometimes, after several hours of operation the temperature in the condensation chamber near the outlet of the vaporizing furnace becomes so high that decomposition of the red lead takes place. Naturally, the cost of the product is higher because of these limitations encountered with the previously known process and apparatus and the output of a plant is lower. The present invention obviates the difficulties of the prior art in a novel manner.

It is therefore an outstanding object of the present invention to provide a method and apparatus for manufacturing red lead in a substantially continuous operation providing a maximum output.

It is a further object of the invention to provide an apparatus for manufacturing red lead which is so constructed that restricted passages do not become clogged.

Another object of the instant invention is the provision of a read lead production apparatus which will not overheat and decompose previously formed product.

Although the novel features which are believed to be characteristic of this invention will be particularly pointed out in claims appended hereto, the invention itself, as to its objects and advantages, the mode of its operation, and the manner of its organization may be better understood by referring to the following description taken in connection with the accompanying drawings forming a part thereof, in which:

The figure is a longitudinal section view of an apparatus embodying the present invention.

In general, the present invention consists of manufacturing red lead by vaporizing metallic lead in an electric furnace and then burning the vapors in a large condensation chamber by use of recirculated excess air, the condensation chamber being disposed horizontally and the vaporizing chamber being disposed vertically slightly below the condensation chamber. The process is carried on with the temperature in the entrance portion of the condensation chamber maintained between 480 and 510° C., the vapor circulation in the condensation chamber is regulated according to the rate of feed of metallic lead into the vaporizing furnace, the excess oxygen returned to be mixed with the vapors is cooled at a rate also proportional to the rate of feed of metallic lead, the portion of the condensation chamber at which the vapors are admitted is cooled by an air flow, and recirculated excess oxygen is supplemented by fresh oxygen delivered through a water cooled nozzle.

Referring to the drawing, the apparatus, generally designated by the reference character 10, comprises a vaporizing furnace 11 and a condensation chamber 12. The vaporizing furnace 11 is generally symmetrical about a vertical axis and comprises a refractory chamber or hearth 13 and three graphite electrodes 14 equally spaced about the axis of the furnace. A wire 15 of metallic lead is continuously fed into the furnace through a sheath 16; the feeding is done automatically by an automatic means, not shown, such that the rate of feeding may be correlated with the other factors affecting the operation of the apparatus. The lead wire 15 is introduced in such a manner that the end lies between the lower ends of the electrodes 14 and the hearth 13 at the place where the arcs are hottest. The sheath 16 surrounding the wire 15 is designed so that no air may enter with the wire and each of the electrodes 14 is provided with a jacket 17 by which means the electrodes may be fed inwardly as desired without air admission into the furnace. To further insure that no air is admitted into the furnace a weak stream of nitrogen is passed with the wire through the sheath 16 through a connection 18 and a similar stream is admitted with the electrodes through a connection 19.

A conduit 20 of relatively small diameter and about a meter in length passes vertically upwardly from the hearth 13 and connects with a conduit 21 which passes from the uppermost end of the conduit 20 into the condensation chamber 12 at a slight upward inclination to the horizontal.

The condensation chamber 12 comprises an elongated tube 22 having end closures 23 and 24, the chamber being oriented with the axis of the tube generally horizontal. A conduit 25 enters the end closure 23 at the upper portion thereof and recirculated oxygen with new oxygen added is admitted to the chamber by the conduit 25. A conveyor screw 26 rests in the bottom of the chamber 12 and serves to carry the red lead out of the chamber when it accumulates in the bottom; the screw 26 passes through the end closure 24 and through a sheath 27 to a packaging device 28. The conveyor screw is driven by a motor 29 through a gear reduction system 30. A circulation fan 31 is mounted on the end closure 24 more or less axially of the chamber 12 and is driven by a variable speed motor 32. A conduit 33 connects the discharge of the fan 31 with the conduit 25.

The outer surface of the condensation chamber 12 is covered by thermal insulation 34 and electrical heating resistances 35 are arranged parallel to the chamber axis in the annular space 36 between the chamber surface and the insulation 34. The annular space communicates with annular spaces 37 and 38 at the end adjacent the end closure 23 and a fan 39 circulates air through the space 36. Excess oxygen is withdrawn from the condensation chamber along the periphery of the fan 31 through a variable outlet 40 and is passed through a tubing system 41 having several direction changes and provided with dust scrapers 42 to recover at trap 43 lead oxide which is carried away in the excess oxygen; the remaining particles are recovered by sprays 44 and recuperator 45.

The conduit 33 for re-cycling oxygen is surrounded by an air cooling jacket 46 in which air is circulated by a fan 147 in counterflow to the flow of re-cycled oxygen through the conduit 33. The conduit 33 is further provided with a conveyor screw 47 actuated by a motor 48 for recovering dusts deposited therein. Supplemental oxygen may be injected into the system at inlet 49. Fresh oxygen is also fed into the system at inlet 50 at the end of the conveyor screw 26.

The operation of a typical unit of the type described above will be described. The condensation chamber 12, the diameter of which is 3 meters and the length 18 meters, is first heated by means of heating resistances 35 for about 12 hours using an average total of 380 kw. The electrodes 14 are washed in nitrogen for half an hour. The furnace 11 is connected with 45 volts between phases, using 200 to 250 kw.; the furnace is operated without the introduction of lead for from 2 to 2½ hours. After this time has elapsed, the lead wire is fed into the furnace at a rate of about 2.3 kilograms per minute; the power consumption of the furnace is kept in the range from 180 to 200 kw. and the voltage in the range from 39 to 41 volts. As soon as the feeding of lead into the furnace is begun, power is removed from the heating resistances 35 and the fan 31 is driven at 400 R. P. M. This fan assumes the responsibility for the proper turbulence and temperature equalization in the condensation chamber 12. For obtaining a high grade of red lead, the temperature in the feeding zone of the chamber 12 near the oxygen supply is kept in the range from 480 to 510° C. and the temperature in the discharge zone near the fan 31 is kept in the range from 460 to 480° C. The feeding rate of the lead wire is slowly increased so that, after eleven hours of operation, the feeding rate is 5 kilograms of lead per minute. This increase in rate of lead feed tends to increase the temperature in the feeding zone of the condenser; to keep the temperature under 510° C. the speed of the fan 31 is progressively raised from 400 to 600 R. P. M., then to 800 R. P. M. and afterwards to 940 R. P. M. The fan output is then in the order of 7.8 cubic meters per second. Fresh oxygen is being introduced at a rate of 400 to 500 liters per minute. The circulation of cooling air in the space 36 by the fan 47 permits the mixture of fresh oxygen and re-cycled oxygen to be introduced through the conduit 25 into the condensation chamber at a temperature around 160 to 180° C. This temperature may be lowered, if necessary, by increasing the speed of the fan 47. Fresh or additional air may be added to the system by means of an adjustable damper, not shown, preferably into the wall defining the annular space 37. With such operation, it is possible to produce 325 kilograms of high grade red lead, fine orange colored which contains 97 to 98% of $Pb_3O_4$ and which may have a bulk density lower than 1.0 gram per cubic centimeter and some as low as 0.65 gross per cubic centimeter.

One of the main features of the process of the applicant consists in passing a flow of the reacting mixture of lead vapor and oxygen through a reaction zone in a substantially horizontal direction; this is important in that the reacting mixture does not move in counterflow to the falling particles of red lead. In prior art devices the red lead falling through the hot reacting mixture decomposes with resultant inefficient operation. In the preferred emobdiment the condensation chamber and the direction of flow of the reacting mixture are horizontal, but it should be realized that the advantages of the present invention can be obtained with the flow taking place at a substantial angle to horizontal so long as provision is made for the fall of the red lead particles away from the entrance zone of the lead vapor and the oxygen into the chamber. Under certain circumstances air or air enriched with oxygen may be used as the oxidizing agent. Another important feature of the invention lies in the fact that the temperature of the entrance portion of the condensation chamber is maintained within the range from 480 to 510° C. by regulating the speed of the fan which circulates the vapor in the condensation chamber, by cooling the recirculated excess oxygen and by cooling the exterior of the apparatus.

While certain novel features of the invention have been shown and described and are pointed out in the annexed claims, it will be understood that various omissions, substitutions, and changes in the forms and details of the process and apparatus illustrated and in its operation may be made by those skilled in the art without departing from the spirit of the invention.

The invention having thus been described, what is claimed as new and desired to secure by Letters Patent is:

1. Apparatus for manufacturing red lead comprising a vaporizing furnace, a condensing chamber of horizontally-elongated form having a communication at one end with the vaporizing furnace, said vaporizing furnace being a three-phase electrical-arc furnace having a means for feeding metallic lead wire into the furnace arcs, means located at the end of the chamber adjacent the communication with the vaporizing furnace for introducing air into the condensing chamber, a fan located at the end of the chamber opposite the communication with the vaporizing furnace, a conduit passing from the fan to the said introducing means, the fan serving to introduce air into the conduit for recirculation thereof to the introducing means, a conveyor screw residing in the lower part of the chamber, electrical heating means surrounding a substantial part of the chamber, a first cooling means connected to said heating means for regulating chamber temperature, and a second cooling means connected to said conduit for regulating the temperature of the recirculating gases.

2. Apparatus for manufacturing red lead comprising a vaporizing furnace, a condensing chamber of horizontally-elongated form having a communication at one end with the vaporizing furnace, said vaporizing furnace being an electrical-arc furnace having a means for feeding metallic lead into the furnace arc, means located at the end of the chamber adjacent the communication with the vaporizing furnace for introducing air into the condensing chamber, draft means located at the end of the chamber opposite the communication with the vaporizing furnace, a conduit passing from the draft means to the said introducing means, the draft means serving to introduce air into the conduit for recirculation thereof to the introducing means, a conveying means residing in the lower part of the chamber, electrical heating means surrounding a substantial part of the chamber, a first cooling means connected to said heating means for regulating chamber temperature, and a second cooling means connected to said conduit for regulating the temperature of the recirculating gases.

References Cited in the file of this patent

UNITED STATES PATENTS

| | | |
|---|---|---|
| 1,156,079 | Holley | Oct. 12, 1915 |
| 1,617,887 | Wilhelm | Feb. 15, 1927 |
| 1,649,428 | Waring | Nov. 15, 1927 |
| 1,770,777 | Haynes | July 15, 1930 |
| 1,773,562 | White | Aug. 19, 1930 |
| 1,913,391 | Hutchinson | June 13, 1933 |
| 2,065,218 | Garesche | Dec. 22, 1936 |
| 2,383,220 | Seabury et al. | Aug. 21, 1945 |
| 2,478,226 | Badham | Aug. 9, 1949 |
| 2,490,519 | Haunz | Dec. 6, 1949 |
| 2,642,336 | Greenawalt | June 16, 1953 |

FOREIGN PATENTS

| | | |
|---|---|---|
| 295,975 | Great Britain | Aug. 22, 1928 |
| 502,142 | Great Britain | Mar. 8, 1939 |